(12) United States Patent
Zhou et al.

(10) Patent No.: US 11,272,434 B2
(45) Date of Patent: Mar. 8, 2022

(54) NARROW BEAM RELATED SEARCH INFORMATION

(71) Applicant: QUALCOMM Incorporated, San Diego, CA (US)

(72) Inventors: Yan Zhou, San Diego, CA (US); Sumeeth Nagaraja, Los Altos, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 16/546,012

(22) Filed: Aug. 20, 2019

(65) Prior Publication Data

US 2020/0068485 A1 Feb. 27, 2020

Related U.S. Application Data

(60) Provisional application No. 62/720,661, filed on Aug. 21, 2018.

(51) Int. Cl.
*H04W 48/16* (2009.01)
*H04W 36/00* (2009.01)
(Continued)

(52) U.S. Cl.
CPC ......... *H04W 48/16* (2013.01); *H04J 11/0073* (2013.01); *H04J 11/0076* (2013.01); *H04W 36/00835* (2018.08); *H04W 72/046* (2013.01)

(58) Field of Classification Search
CPC ........... H04W 48/16; H04W 36/00835; H04W 72/046; H04W 16/28; H04J 11/0076; H04J 11/0073; H04B 7/02
See application file for complete search history.

(56) References Cited

U.S. PATENT DOCUMENTS

| 2013/0260741 A1* | 10/2013 | Yamada | H04L 1/0026 |
| | | | 455/422.1 |
| 2015/0327141 A1* | 11/2015 | Jung | H04W 36/24 |
| | | | 370/331 |

(Continued)

FOREIGN PATENT DOCUMENTS

WO 2018017840 A1 1/2018

OTHER PUBLICATIONS

International Search Report and Written Opinion—PCT/US2019/047557—ISA/EPO—dated Nov. 6, 2019.
(Continued)

*Primary Examiner* — Hassan Kizou
*Assistant Examiner* — Abdullahi Ahmed
(74) *Attorney, Agent, or Firm* — Harrity & Harrity LLP\Qualcomm Incorporated

(57) ABSTRACT

Methods and apparatuses are provided which may be implemented in a base station, user equipment, and/or the like, to share information supportive of narrow beam transmissions. For example, a base station may be configured to access a neighbor cell list corresponding to a coverage area, determine a subset of the neighbor cell list corresponding to a first narrow beam to be transmitted, and transmit a message indicative of the subset of the neighbor cell list. In another example, a user equipment may be configured to receive a message indicative of a subset of a neighbor cell list for a portion of a coverage area of a base station corresponding to a first narrow beam, and search for one or more wireless signals based, at least in part, on the subset of the neighbor cell list.

30 Claims, 7 Drawing Sheets

200

(51) Int. Cl.
*H04J 11/00* (2006.01)
*H04W 72/04* (2009.01)

(56) References Cited

U.S. PATENT DOCUMENTS

| | | | |
|---|---|---|---|
| 2018/0152232 A1* | 5/2018 | Cedergren | H04B 7/0695 |
| 2018/0324022 A1* | 11/2018 | Sheng | H04L 5/0048 |
| 2019/0245614 A1* | 8/2019 | Lucky | H04W 36/0061 |
| 2019/0319686 A1* | 10/2019 | Chen, IV | H04W 16/28 |
| 2020/0053608 A1* | 2/2020 | Tao | H04W 36/0094 |
| 2020/0163148 A1* | 5/2020 | Futaki | H04W 36/0072 |
| 2020/0196161 A1* | 6/2020 | Ahn | H04W 80/08 |

OTHER PUBLICATIONS

Samsung: "RS for Beam Management in Multi-TRP Operation Scenarios," 3GPP Draft; R1-1706139 RS for Beam Management in Multi-TRP Operation Scenarios, 3rd Generation Partnership Project (3GPP), Mobile Competence Centre; 650, Route Des Lucioles; F-06921 Sophia-Antipolis, vol. RAN WG1, No. Spokane, USA; Apr. 3, 2017-Apr. 7, 2017, Apr. 2, 2017, XP051244245, 4 pages, Retrieved from the Internet: URL: http://www.3gpp.org/ftp/Meetings_ 3GPP_SYNC/RAN1/Docs/ [retrieved on Apr. 2, 2017] section 2.

* cited by examiner

NARROW BEAM RELATED SEARCH INFORMATION

This application claims priority to and the benefit of provisional patent application No. 62/720,661 filed in the U.S. Patent and Trademark Office on Aug. 21, 2018, the entire content of which is incorporated herein by reference in its entirety and for all purposes.

INTRODUCTION

The following relates generally to wireless communication, and more specifically to techniques for use in supporting narrow beam transmissions, and more particularly to techniques for providing narrow beam related search information and/or making use of such narrow beam related search information.

Wireless communications systems are widely deployed to provide various types of communication content such as voice, video, packet data, messaging, broadcast, and so on. These systems may support communication with multiple users by sharing the available system resources (e.g., broadcast spectrum with regard to time, frequency, spatial, and/or power related aspects). Examples of some multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include several base stations or network access nodes, each supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

The described techniques relate to improved methods, systems, devices, and/or apparatuses that may be used in support of wireless communications.

In accordance with certain aspects, a method may be provided for use by a base station. The method may comprise accessing a neighbor cell list (NCL) corresponding to a coverage area of the base station, determining a subset of the NCL corresponding to a first narrow beam to be transmitted by the base station within at least a portion but not all of the coverage area, and transmitting one or more messages indicative of the subset of the NCL.

By way example, a message may be transmitted to a user equipment (UE) over the first narrow beam possibly without expressly identifying that the subset of the NCL corresponds to the first narrow beam. In another example, a message may be transmitted to a UE over another beam, possibly a second narrow beam, and may expressly identify that the subset of the NCL corresponds to a first narrow beam.

In certain example implementations, a direction of transmission of a first narrow beam, an intended shape of a coverage region of a first narrow beam, or both may or may not change over time, e.g., a first narrow beam may comprise a static beam, a semi-static beam, a sweeping beam, a steered/directed beam, etc. In certain example implementations, a subset of an NCL may be determined, at least in part, based on a direction of transmission of a first narrow beam, an intended shape of a coverage region a first narrow beam, or both, just to name a few examples.

In certain example implementations, the first narrow beam may comprise a primary synchronization signal (PSS), a secondary synchronization signal (SSS), a physical broadcast channel (PBCH), a channel state information-reference signal (CSI-RS), or some combination thereof and/or the like, and/or may comprise a beam in mmWave band.

In some example implementations, one or more of the above example methods may further comprise subsequently receiving a report message indicative of a search result from a search for wireless signals conducted by a UE based, at least in part, on a subset of the NCL. The base station may affect the NCL based, at least in part, on such a search result. For example, a search result may be based, at least in part, on a received signal strength for at least one wireless signal received by the UE or other device that may be (or may have been) located within of a coverage region a first narrow beam. In certain example implementations, a search for wireless signals by such as UE may comprise an inter-frequency search, an intra-frequency search, an idle mode search, a connected mode search, or some combination thereof just to name a few examples.

In accordance with certain other aspects, a base station may be provided which comprises memory, a transmitter, and a processing unit (e.g., a processor, a circuit, etc.). For example, the processing unit may be coupled to the memory and the transmitter and configured to access (e.g., obtain) an NCL that may be stored in the memory, wherein the NCL corresponds to a coverage area of the base station. The processing unit may determine a subset of the NCL corresponding to a first narrow beam to be transmitted via the transmitter within a portion but not all of the coverage area and may initiate transmission of a message via the transmitter which is indicative of the subset of the NCL. In certain example implementations, the base station may further comprise a receiver, wherein the processing unit is further coupled to the receiver and configured to obtain a report message via the receiver which may be indicative of a search result, and the processing unit may affect the NCL based, at least in part, on the search result.

In accordance with still other aspects, a method may be provided for use by a UE. Here, for example, a method may comprise receiving a message indicative of a subset of an NCL for a portion of a coverage area of a base station corresponding to a first narrow beam, and searching for one or more wireless signals based, at least in part, on the subset of the NCL. In certain example implementations, the method may further comprise generating a search result based, at least in part, on the searching for one or more wireless signals received by a UE, e.g., while possibly located within an intended shape of a coverage region of the first narrow beam, and possibly transmitting a report message indicative of the search result, e.g., to the base station or some other device.

In accordance with yet other aspects, a UE may be provided, which comprises memory, a receiver, and a processing unit (e.g., a processor, a circuit, etc.). The processing unit may be coupled to the memory and the receiver and configured to access at least a portion of a message from the memory, the message having been received via the receiver and being indicative of a subset of an NCL for a portion of a coverage area of a base station corresponding to a first narrow beam to be transmitted by the base station. The processing unit may be further configured to initiate a search via the receiver for one or more wireless signals based, at least in part, on the subset of the NCL. In certain example implementations, a UE may further comprise a transmitter that may be coupled to the processing unit, and the processing unit may be further configured to generate a search result based, at least in part, on one or more wireless signals received via the receiver, e.g., while the UE may be located within an intended shape of a coverage region of the first narrow beam, and possibly initiate transmission of a report message via the transmitter, the report message being indicative of the search result.

BRIEF DESCRIPTION OF THE DRAWINGS

FIGS. 2A, 2B and 2C are diagrams graphically illustrating several representative base stations, for example as in FIG. 1, wherein FIG. 2A presents representative coverage areas for some base stations, and FIGS. 2B and 2C present some corresponding representative narrow beam coverage regions, in accordance with certain aspects of the present disclosure.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
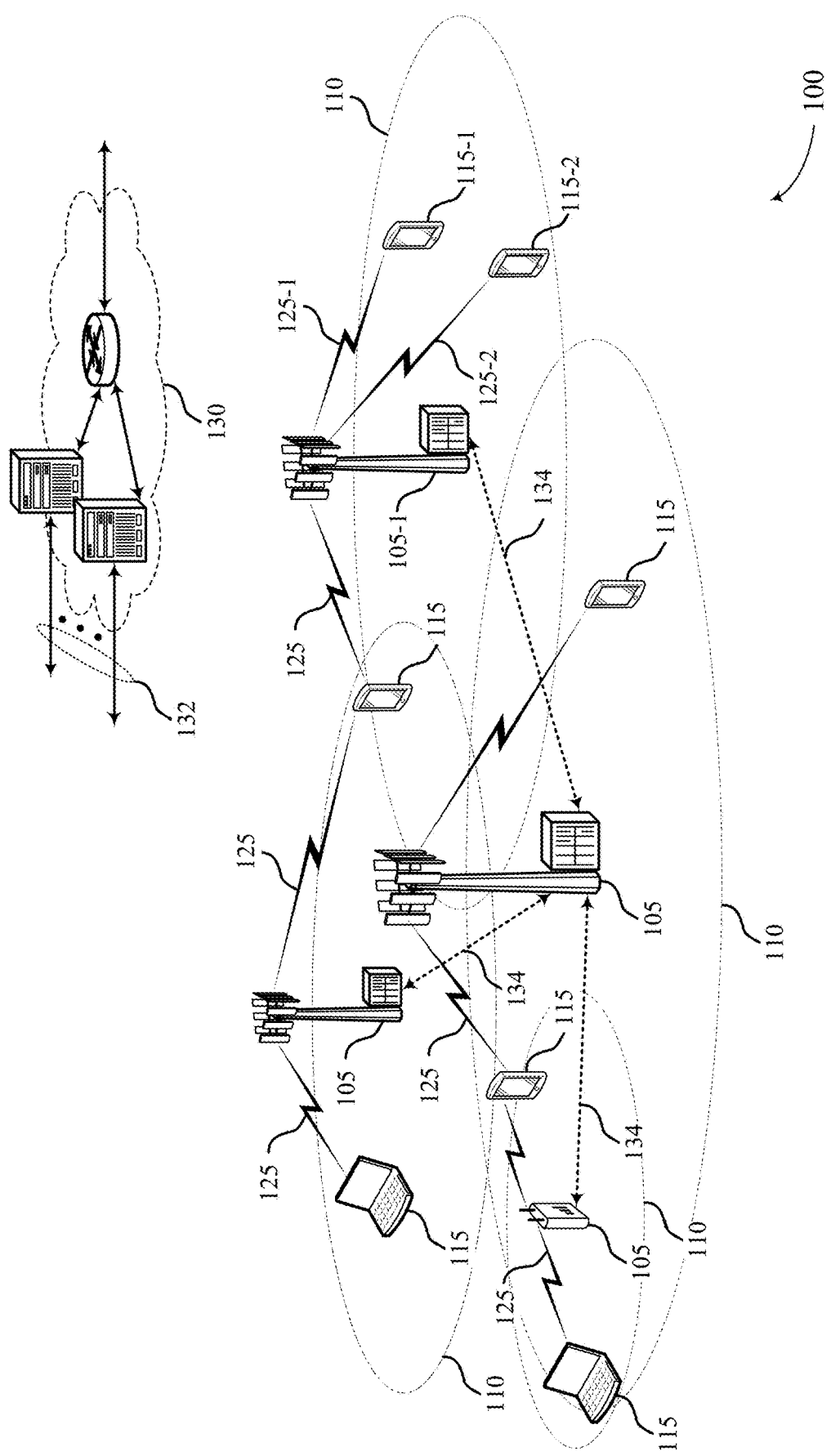
FIG. 1 illustrates an example of a system for wireless communication that may support narrow beam transmissions, in accordance with certain aspects of the present disclosure.

FIG. 1 illustrates an example of a wireless communications system 100 that may support narrow beam transmissions, e.g., between a base station and a user equipment (UE), in accordance with various aspects of the present disclosure.

As shown wireless communications system 100 may include, for example, base stations 105, UEs 115, and a core network 130. In some examples, wireless communications system 100 may comprise a Long-Term Evolution (LTE) network, an LTE-Advanced (LTE-A) network, or a New Radio (NR) network. In some cases, wireless communications system 100 may support enhanced broadband communications, narrow beam transmissions, ultra-reliable (e.g., mission critical) communications, low latency communications, communications with low-cost and low-complexity devices, etc.

In some examples, wireless communication network 100 may comprise one or any combination of communication technologies, including a new radio (NR) or 5G technology, LTE, LTE-A, MuLTEfire technology, a Wi-Fi technology, a Bluetooth technology, or any other long or short range wireless communication technology/framework. In LTE/LTE-A/MuLTEfire networks, the term evolved node B (eNB) may be generally used to describe the base stations 105, while the term UE may be generally used to describe the UEs 115. Wireless communication network 100 may be a heterogeneous technology network in which different types of eNBs provide coverage for various geographical regions. For example, an eNB or base station 105 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station and a coverage region may be associated with a narrow beam transmission, depending on context.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). One or more of the base stations 105 may be configured to transmit one or more narrow beam transmissions, e.g., as described in greater detail by way of examples herein. The UEs 115 described herein may be able to communicate with various types of base stations 105 and network equipment including macro eNB s, small cell eNB s, gNBs, relay base stations, and the like.

As illustrated in FIG. 1, a base station 105 may be associated with a geographic coverage area 110 in which communications with various UEs 115 is supported. A base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

A geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station or by different base stations. The wireless communications system 100 may include, for example, a heterogeneous LTE/LTE-A or NR network in which different types of base stations provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates. In accordance with certain example implementations, a "narrow beam" transmission may be intended to have a coverage region that may overlap, at least in-part, some but not all of a geographic coverage area 110 of a cell, a sector, or other like "wider beam" transmission. In certain instances, a narrow beam transmission may comprise a downlink transmission, e.g., from a base station to a UE. In certain instances, a UE may transmit an uplink transmission, e.g., to a base station, using a narrow beam transmission or the like.

UEs 115 may be dispersed throughout the wireless communications system 100, and such UEs may, at times, be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that may make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, a UE 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P), a device-to-device (D2D) protocol, or the like). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling/allocation of resources for D2D communications. In other cases, some D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

A core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

Some of the network devices, such as a base station 105, may include subcomponents such as an access network entity, which may be an example of an access node controller (ANC). An access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW, or mmWave) band communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed/shared radio frequency spectrum bands. For example, wireless communications system 100 may employ LTE License Assisted Access (LTE-LAA) or LTE-Unlicensed (LTE-U) radio access technology or MuLTEfire radio access technology or NR technology in an unlicensed/shared radio frequency band such as the 5 GHz ISM band. When operating in unlicensed/shared radio frequency spectrum bands, wireless devices such as base stations 105 and UEs 115 may employ listen-before-talk (LBT) procedures to ensure a frequency channel is clear before transmitting data. In some cases, operations in unlicensed/shared radio frequency bands may be based on a CA configuration in conjunction with CCs operating in a licensed band. Operations in unlicensed/shared radio frequency spectrum may include downlink transmissions, uplink transmissions, peer-to-peer transmissions, or a combination of these. Duplexing in unlicensed/shared radio frequency spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115, e.g., to provide narrow beam transmissions. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation). Beamforming may be used for narrow beam transmissions.

In one example, a base station 105 may multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a slot may further be divided into multiple mini-slots containing one or more symbols and, in some instances, a symbol of a mini-slot or a mini-slot may be the smallest unit of scheduling. Each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one subcarrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs that may support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed/shared radio frequency spectrum or shared radio frequency spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed/ shared radio frequency spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2A:
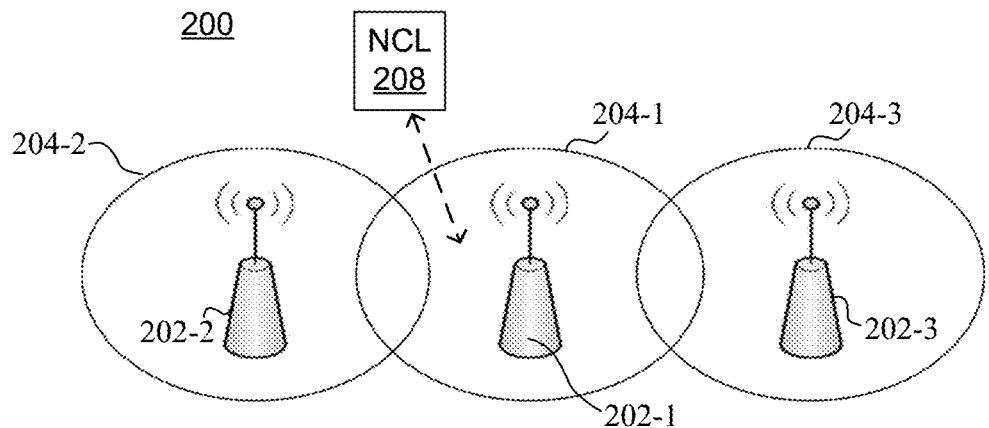
Figure 2B:
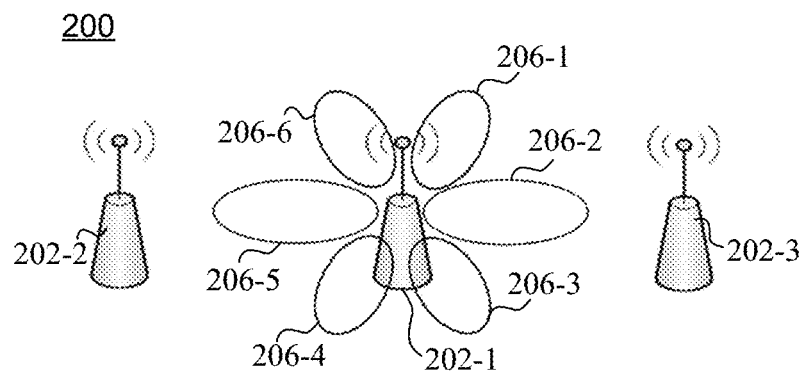
Figure 2C:
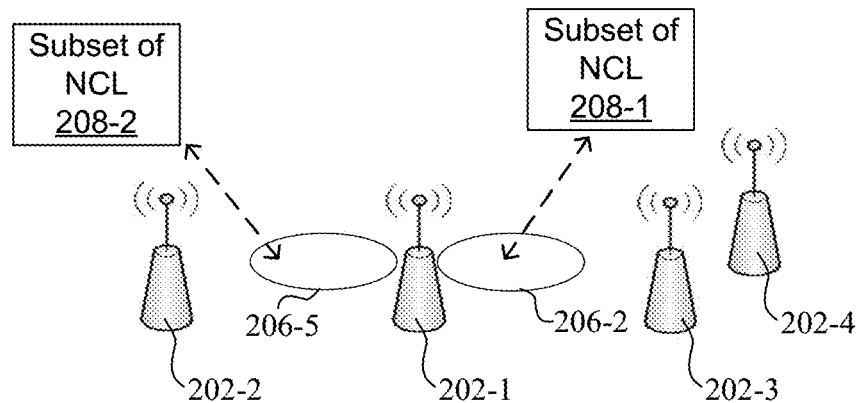

Attention is drawn next to FIGS. 2A, 2B and 2C, which are diagrams graphically illustrating portions of a network 200 including several representative base stations 202, which may comprise base stations as in FIG. 1, for example.

FIG. 2A graphically presents representative coverage areas for three base stations, namely base station 202-1 and two neighboring base stations 202-2 and 202-3. Base station 202-1 is shown as having a coverage area 204-1, base station 202-2 is shown as having a coverage area 204-2, and base station 202-3 is shown as having a coverage area 204-3. Although illustrated in similar fashion, it should be understood that the base stations and their respective coverage areas may be the same or different in size/shape in certain implementations.

As further illustrated, base station 202-1 may maintain or otherwise have access to a neighbor cell list (NCL) 208. With regard to the example in FIG. 2A, NCL 208 may include information indicating that base stations 202-2 and 202-3 are near enough to be considered "neighboring" cells. It should be understood that in certain implementations, NCL 208 may include information about one or more other base stations or the like (not shown in FIG. 2A) that may be likewise considered as neighboring cells. Although the term "cell" may be used with regard to the information in NCL 208, it should be understood that such information may indicate various transmitting devices (and/or expected signaling) as being in the neighborhood with regard to all or part of the coverage area of base station 202-1. Thus, for example, NCL 208 may indicate that a transmitting device is within all or part or possibly nearby a coverage area 204-1, and such transmitting device need not necessarily be a base station serving an entire "cell" or "sector".

FIG. 2B, which is similar to FIG. 2A, graphically presents several corresponding representative narrow beam coverage regions 206 (shown as 206-1, 206-2, 206-3, 206-4, 206-5, and 206-6) corresponding to base station 202-1. As illustrated, neighboring base station 202-2 appears to be located relative to base station 202-1 in a direction corresponding to narrow beam coverage region 206-5. Accordingly, in certain example implementations, base station 202-2 may be of interest to a UE that may be located within narrow beam coverage region 206-5, e.g., for mobility purposes, etc. Similarly, neighboring base station 202-3 appears to be located, again relative to base station 202-1, in another direction that is corresponding to narrow beam coverage region 206-2. Hence, base station 202-3 may be of like interest to a UE that may be located within narrow beam coverage region 206-2.

With regard to base station 202-1, FIG. 2A and FIG. 2B demonstrate by way of illustration that the example coverage area 204-1 of FIG. 2A encompasses a larger region than any of the example narrow beam coverage regions of FIG. 2B. By way of example, coverage area 204-1 may correspond to base station 202-1 employing a substantially omni-directional or other wide beam forming antenna (not shown), while narrow beam coverage region 206-1 may correspond to base station 202-1 employing a directional antenna or other like narrow beam forming antenna (not shown).

Although FIG. 2B shows six narrow beam coverage regions of like size and shape, it should be understood that claimed subject matter is not necessarily so limited. Furthermore, it should be understood that certain example base stations may be capable of transmitting one or more narrow beams, or other non-narrow beams, or possibly some combination thereof, potentially on a selective basis. Also, as previously mentioned, in certain implementations, an example narrow beam may be transmitted as a static beam, a semi-static beam, a sweeping beam, a steered/directed beam, etc.

With this in mind, attention is drawn next to FIG. 2C, which is similar to FIG. 2B, but includes an additional base station, namely, base station 202-4. In this example, it is assumed that neighboring base stations 202-2 and 202-3 are already identified in NCL 208 (FIG. 2A). Hence, in accordance with certain techniques presented herein, base station 202-1 may be configured to transmit a subset of NCL 208-1 corresponding to narrow beam coverage area 206-2 and which may be indicative of neighboring base station 202-3. Similarly, base station 202-1 may be configured to transmit a subset of NCL 208-2 corresponding to narrow beam coverage area 206-5 and which may be indicative of neighboring base station 202-2. In this illustrative example, it may be that subset of NCL 208-1 and subset of NCL 208-2 will completely different with regard to indicating base stations of interest since the corresponding narrow beam coverage areas 206-2 and 206-5, respectively, appear on opposing sides of base station 202-1.

In certain instances, a subset of NCL may be transmitted via a narrow beam corresponding to a narrow beam coverage area, and/or perhaps one or more adjacent or overlapping narrow beams. For example, in FIG. 2C, subset of NCL 208-1 may be transmitted in whole or part via the narrow beam forming narrow beam coverage area 206-2. A UE receiving subset of NCL-208-1 may, in certain examples, by inference assume that such may be applicable to the UE's current location. However, in certain other examples, a UE receiving a subset of NCL may determine that such subset may be applicable to a particular narrow beam coverage area that the UE may or may not be currently located within.

FIG. 2C is also intended to illustrate that base station 202-1 may alter NCL 208 in some manner, from time to time, e.g., in response to one or more report messages received from one or more UEs. Here, for example, assume that a UE (not shown) currently located within narrow beam coverage area 206-2 has received subset of NCL 208-1. Such a UE may conduct a search for other base stations based, at least in part, on such subset of NCL 208-1. Such a search may, for example, result in the UE identifying base station 202-4. As such, this UE may transmit a report message to base station 202-1, for example, which may indicative in some manner of discovered base station 202-4. Such a report message may also be indicative of information that may be of use by base station 202-1 with regard to NCL 208. By way of example, a report message may comprise identifying information, location information, and/or the like or some combination thereof with regard to base station 202-4. A report message may also comprise relative information regarding the UE, e.g., location information, etc. Thus, in this example, base station 202-1 may include information regarding base station 202-4 in NCL 208, such that, a later provided subset of NCL 208-1 may be indicative of base station 202-3 and 202-4.

Figure 3:
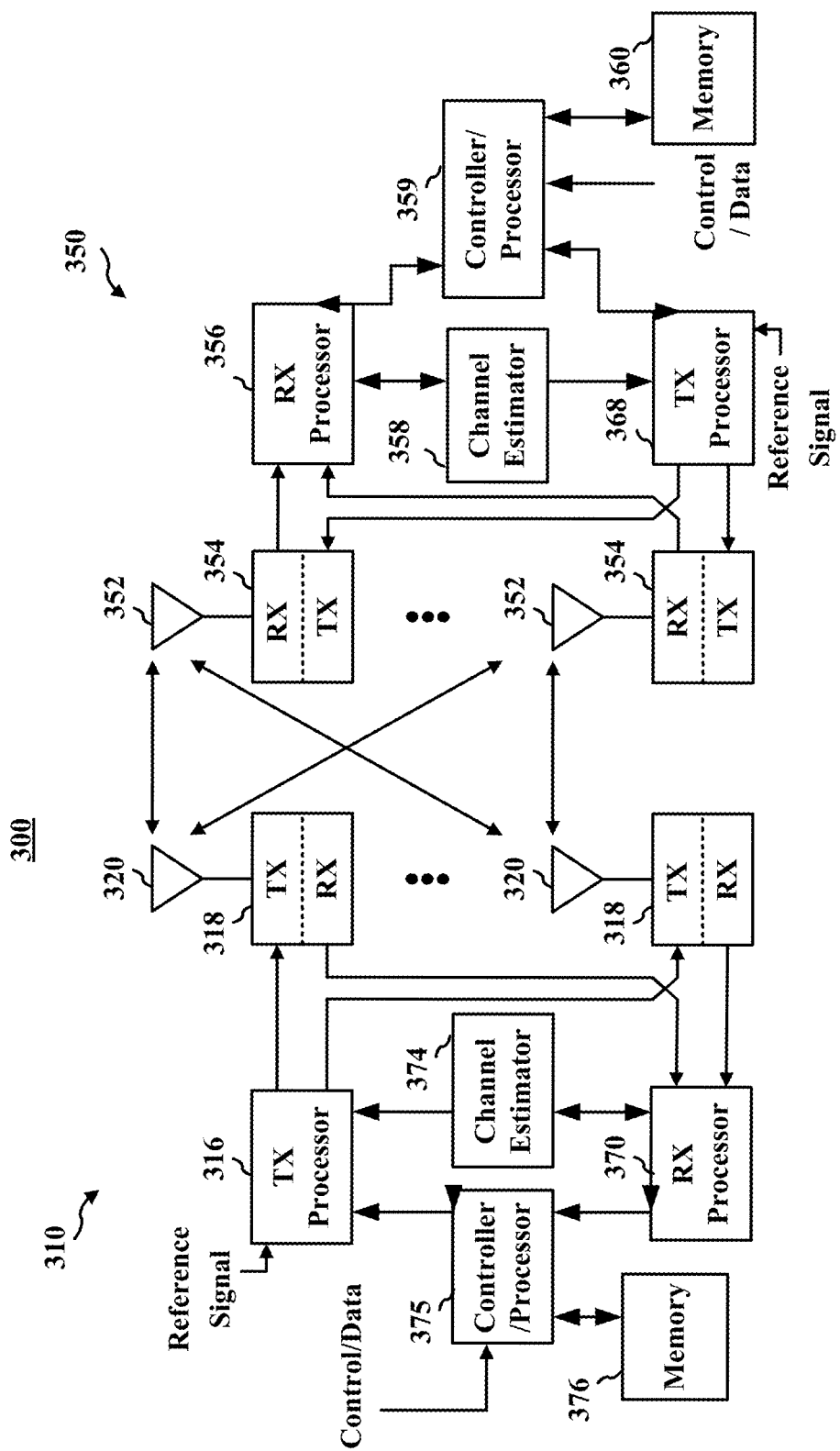
FIG. 3 is a diagram illustrating an example of a base station and a user equipment (UE) that may support narrow beam transmissions, for example as in the system illustrated in FIG. 1, in accordance with certain aspects of the present disclosure.

Attention in drawn next to FIG. 3, which is a block diagram of an example base station 310 in communication with an example UE 350 in an access network 300. In the downlink (DL), IP packets from the EPC 160 may be provided to a controller/processor 375. The controller/processor 375 may, for example, implement layer 3 and layer 2 functionality. Layer 3 may include a radio resource control (RRC) layer, and layer 2 may include a packet data convergence protocol (PDCP) layer, a radio link control (RLC) layer, and a medium access control (MAC) layer. The controller/processor 375 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 may implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission. The controller/processor and/or other example components in base station 310 may represent one or more processing units that may be configured to support/implement certain D2D channel measurement and communication techniques as provided herein.

At the UE 350, each receiver 354RX may receive a signal through its respective antenna(s) 352. Each receiver 354RX may recover information modulated onto an RF carrier and provides the information to the receive (RX) processor 356. The TX processor 368 and the RX processor 356 may implement layer 1 functionality associated with various signal processing functions. The RX processor 356 may perform spatial processing on the information to recover spatial streams destined for the UE 350. If multiple spatial streams are destined for the UE 350, such may be combined by the RX processor 356 into a single OFDM symbol stream. The RX processor 356 may convert the OFDM symbol stream from the time-domain to the frequency domain, e.g., using a Fast Fourier Transform (FFT). The frequency domain signal may include a separate OFDM symbol stream for each subcarrier of the OFDM signal. The symbols on each subcarrier, and the reference signal, may be recovered and demodulated by determining the most likely signal constellation points transmitted by the base station 310. Such soft decisions may be based on channel estimates computed by the channel estimator 358. The soft decisions may be decoded and deinterleaved to recover the data and/or control signals that were originally transmitted by the base station 310 on the physical channel. The data and control signals may be provided to the controller/processor 359, which may implement layer 3 and layer 2 functionality.

The controller/processor 359 may be associated with a memory 360 that stores program codes and data. The memory 360 may be referred to as a computer-readable medium. In the UL, the controller/processor 359 may provide demultiplexing between transport and logical channels, packet reassembly, deciphering, header decompression, and control signal processing to recover IP packets from the EPC 160. The controller/processor 359 may also be responsible for error detection using an ACK and/or NACK protocol to support HARQ operations. The controller/processor and/or other example components in UE 350 may represent one or more processing units as provided herein.

Similar to the functionality described in connection with the DL transmission by the base station 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink (UL) transmission may be processed at the base station 310 in a manner similar to that described in connection with the receiver function at the UE 350. Each receiver 318RX may receive a signal through its respective antenna(s) 320. Each receiver 318RX may recover information modulated onto an RF carrier and provide the information to a RX processor 370.

The controller/processor 375 may be associated with a memory 376 that stores program codes and data. The memory 376 may be referred to as a computer-readable medium. In the UL, the controller/processor 375 may provide demultiplexing between transport and logical channels, packet reassembly, deciphering, header decompression, control signal processing to recover IP packets from the UE 350. IP packets from the controller/processor 375 may be provided to the EPC 160. The controller/processor 375 may also be responsible for error detection using an ACK and/or NACK protocol to support HARQ operations.

It should be understood that the example of FIG. 3 is not intended to necessarily limit claimed subject matter, and that various transmitter, receiver and/or transceiver implementations may be used to benefit from the techniques presented herein.

Figure 4:
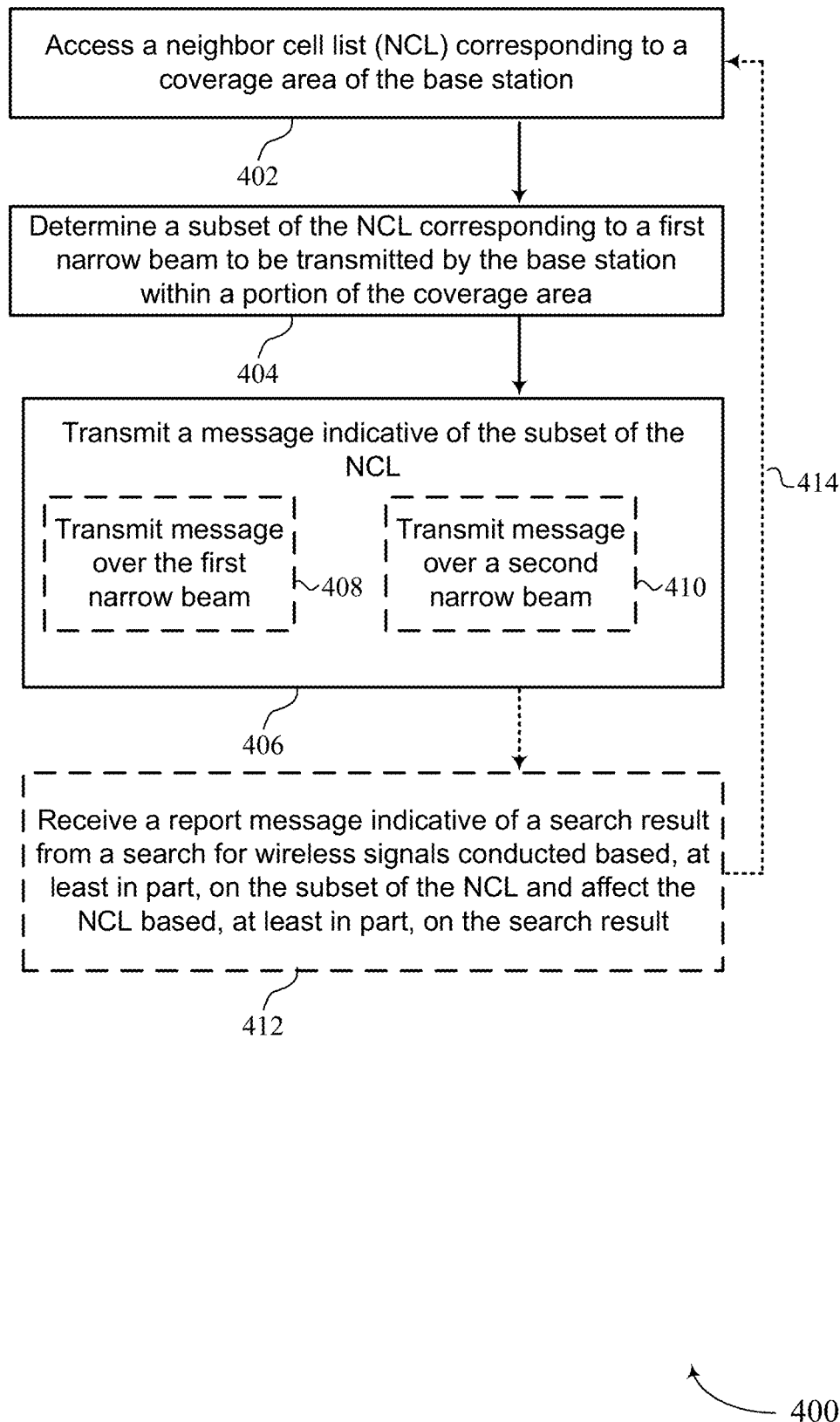
FIG. 4 is a flow diagram illustrating an example method for use by a base station to support narrow beam transmissions, in accordance with certain aspects of the present disclosure.

With this in mind, attention is drawn next to FIG. 4, which is a flow diagram illustrating an example method 400 for use at a base station, in accordance with certain aspects of the present disclosure. Blocks shown in dashed lines herein are intended to be optional in certain implementations. Thus, for example, blocks 410, 412 and 414 in example method 400 may be individually optional, while blocks 402, 404 and 406 may in general represent a complete example method 400 in certain implementations.

At example block 402, a base station may access an NCL corresponding to a coverage area of the base station. An NCL may, for example, be indicative of one or more neighboring base stations.

At example block 404, the base station may determine a subset of the NCL corresponding to a first narrow beam to be transmitted by the base station within a portion of the coverage area of the base station. In certain implementations, a first narrow beam may form a narrow beam coverage region within the coverage area of the base station. In certain implementations, a portion of resulting narrow beam coverage area may extend beyond the coverage area of the base station.

In certain implementations, a subset of the NCL may be determined, at least in part, based on a (relative) direction of transmission of the first narrow beam, an intended shape of a coverage region of the first narrow beam, or both. In certain implementations, a transmitted first narrow beam may, for example, comprise a primary synchronization signal (PSS), a secondary synchronization signal (SSS), a physical broadcast channel (PBCH), a channel state information-reference signal (CSI-RS), or some combination thereof. In certain example implementations, the first narrow beam may comprise a beam in mmWave band. However, it should be understood that claimed subject matter is not necessarily intended to be limited by such examples.

At example block 406, the base station may transmit a message indicative of the subset of the NCL. In certain implementations, as previously mentioned, a base station may transmit such a message over one or more narrow beams. Thus, for example, at (optional) block 408 such a message may be transmitted over the first narrow beam itself. Thus, for example, such a message may not expressly identify that the subset of the NCL corresponds to the first narrow beam, however, a receiving UE may infer that such a subset is applicable to a location of the UE within the narrow beam coverage area of the first narrow beam. In another example, at (optional) block 410, such a message may instead be transmitted over a second narrow beam and may expressly identify that the subset of the NCL corresponds to the first narrow beam.

At example block 412, which is optional, the base station may (subsequently) receive a report message indicative of a search result from a search for wireless signals conducted by a UE based, at least in part, on the subset of the NCL at provided at block 406. Thus, for example as represented by dashed line 414, the base station may affect (e.g., alter) the NCL based, at least in part, on a search result in the report message.

In certain implementations, a search result may be based, at least in part, on a received signal strength for at least one wireless signal received by a device (e.g., a UE) located within an intended shape of a coverage region of the first narrow beam. In certain implementations, a search for wireless signals may comprise an inter-frequency search, an intra-frequency search, an idle mode search, a connected mode search, or some combination thereof.

Figure 5:
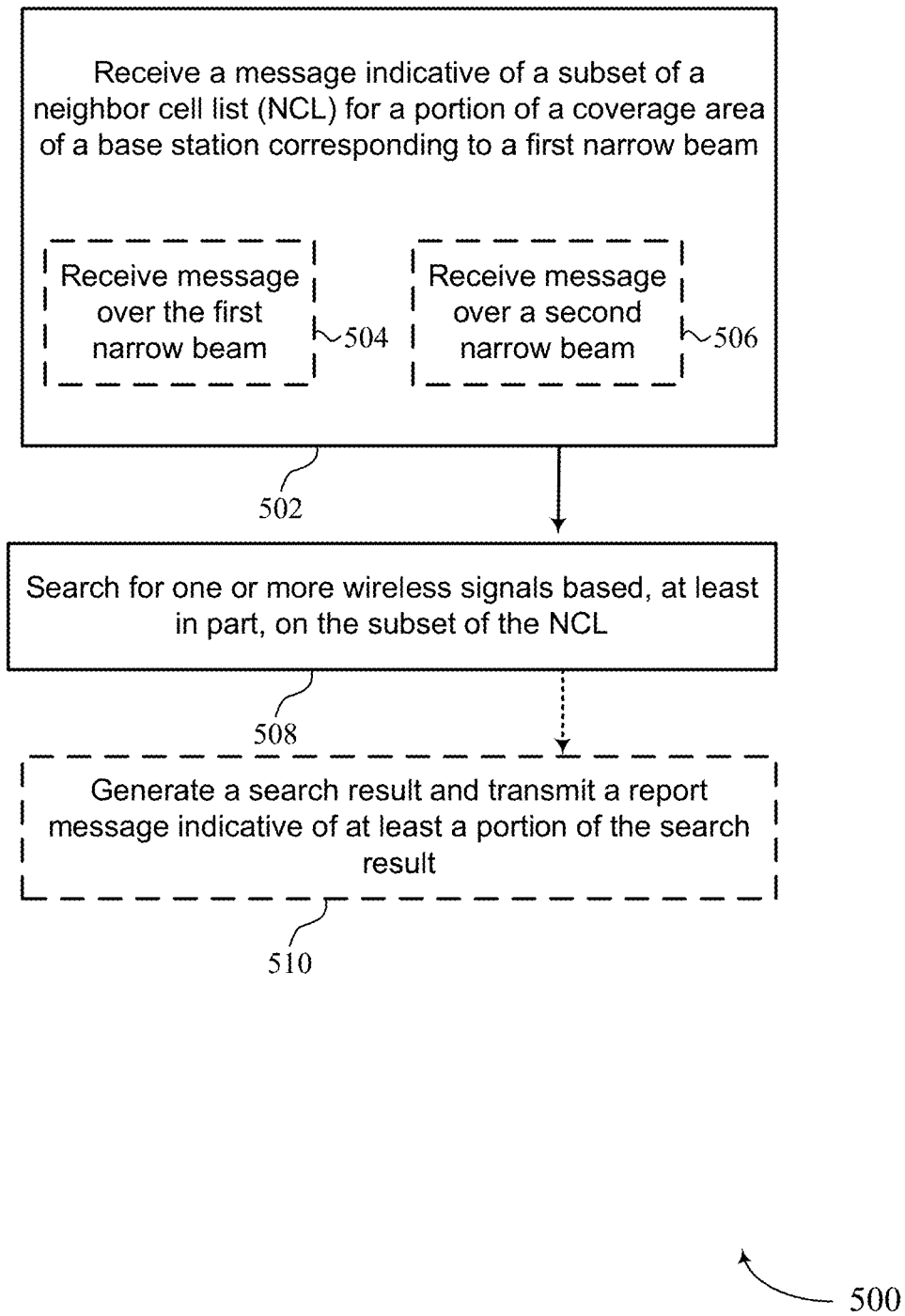
FIG. 5 is a flow diagram illustrating an example method for use by a UE to support narrow beam transmissions, in accordance with certain aspects of the present disclosure.

Attention is drawn next to FIG. 5, which is a flow diagram illustrating an example method 500 for use by a device, such as, a UE, in accordance with certain aspects of the present disclosure. Blocks shown in dashed lines are intended to be optional in certain implementations. Thus, for example, blocks 504, 506 and 510 in example method 500 may be individually optional, while blocks 502 and 508 may in general represent a complete example method 500 in certain implementations.

With this in mind, at example block 502, a UE may receive a message indicative of a subset of an NCL for a portion of a coverage area of a base station corresponding to a first narrow beam. In certain implementations, at (optional) block 504, the UE may receive the message over the first narrow beam. In certain implementations, at (optional) block 506, the UE may receive the message over a second narrow beam.

At example block 508, the UE may search for one or more wireless signals based, at least in part, on the subset of the NCL. Thus, for example, a UE may conduct a search and generate a search result while located within a narrow beam coverage region formed by the first narrow beam. At example (optional) block 510, the UE may transmit, e.g., to the base station, a report message indicative of all or part of the search result.

Figure 6:
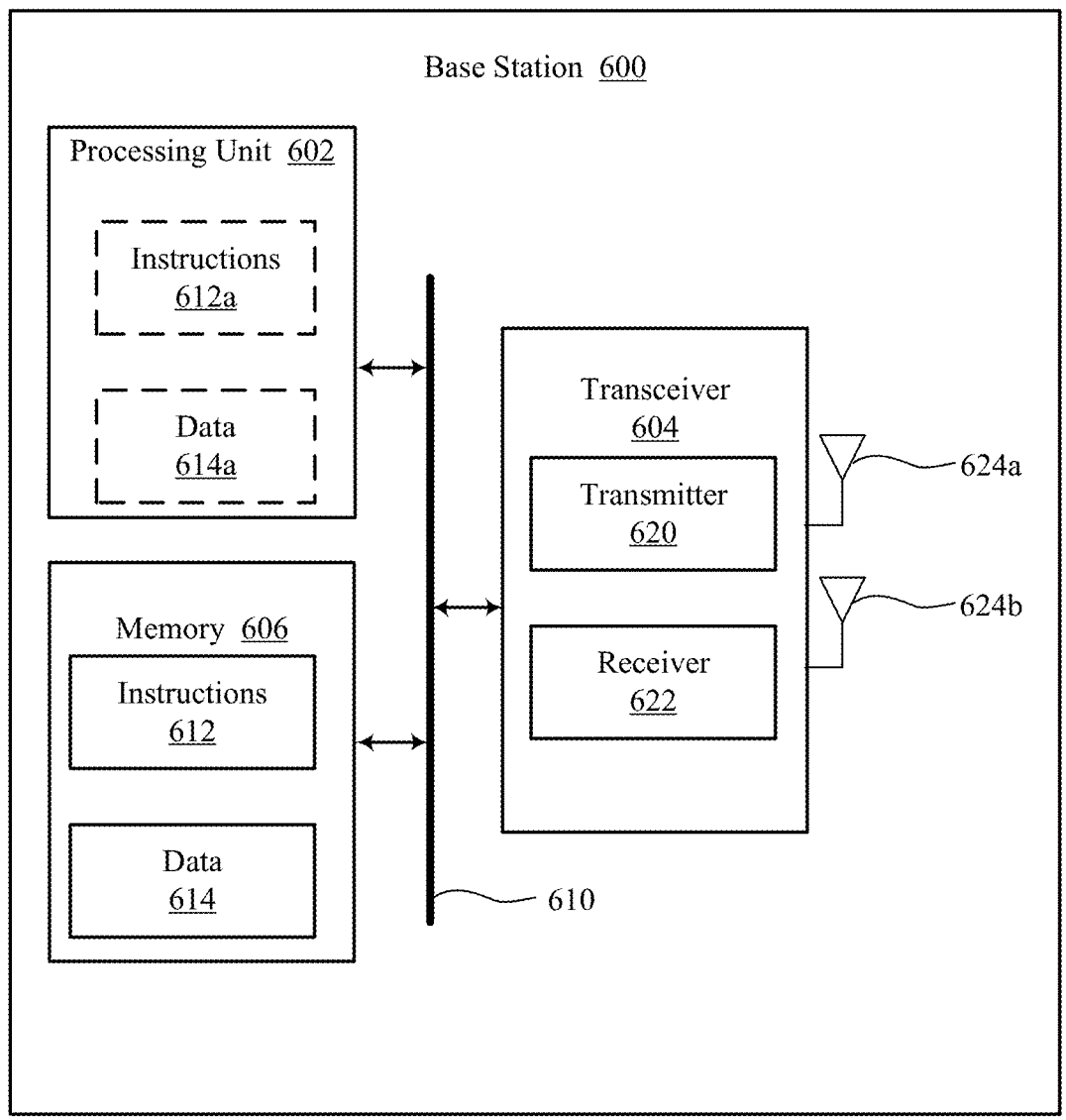
FIG. 6 is a diagram illustrating some example components that may be included within a base station, in accordance with certain aspects of the present disclosure.

Attention is drawn next to FIG. 6, which is a block diagram illustrating some example components that may be included within a base station 600.

In certain example implementations, base station 600 may comprise or otherwise represent an access point, a NodeB, an evolved NodeB, a gNB, etc. Base station 600 includes a processing unit 602. The processing unit 602 may be a general-purpose single- or multi-chip microprocessor (e.g., an ARM), a special purpose microprocessor (e.g., a digital signal processor (DSP)), a microcontroller, a programmable gate array, etc. The processing unit 602 may be referred to as a central processing unit (CPU). Although just a single processing unit 602 is shown in the base station 600 of FIG. 6, in an alternative configuration, a combination of processors (e.g., an ARM and DSP) could be used.

Base station 600 may also include memory 606. The memory 606 may be any electronic component capable of storing electronic information. The memory 606 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof. As illustrated, at times, data 614 and/or instructions 612 may be stored in memory 606. Instructions 612 may be executable by processing unit 602, e.g., to implement, at least in part, techniques disclosed herein. Executing instructions 612 may involve the use of data 614 that may be stored in memory 606. When processing unit 602 executes instructions 612, various portions of instructions 612a may be loaded onto processing unit 602, and various pieces of data 614a may be loaded onto processing unit 602.

Base station 600 may also include a transmitter 620 and a receiver 622 to allow transmission and reception of wireless signals, e.g., to and from one or more UEs (not shown). Transmitter 620 and receiver 622 may be collectively referred to as a transceiver 604. One or more antennas 624a-b may be electrically coupled to the transceiver 604. Base station 600 may also include (not shown) multiple transmitters, multiple receivers and/or multiple transceivers.

The various components of base station 600 may be coupled together by one or more buses or the like, e.g., which may include a power bus, a control signal bus, a status signal bus, a data bus, etc. For the sake of clarity, the various buses are represented in FIG. 6 as a bus 610.

Figure 7:
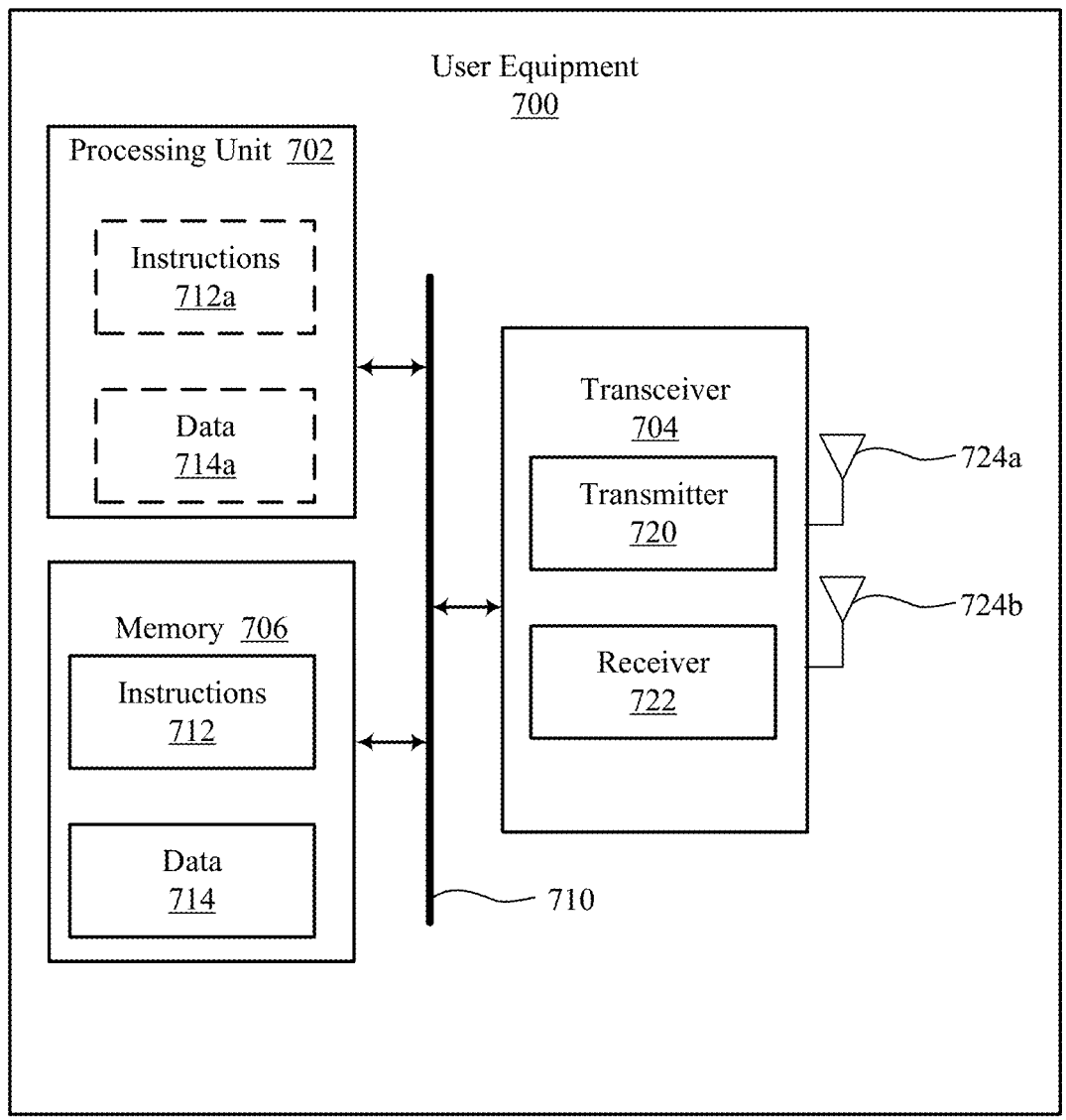
FIG. 7 is a diagram illustrating some example components that may be included within a UE, in accordance with certain aspects of the present disclosure.

FIG. 7 is a block diagram illustrating some example components that may be included within a UE 700.

UE 700 may comprise a processing unit 702. Processing unit 702 may be a general-purpose single- or multi-chip microprocessor (e.g., an ARM), a special purpose microprocessor (e.g., a digital signal processor (DSP)), a microcontroller, a programmable gate array, etc. Processing unit 702 may be referred to as a central processing unit (CPU). Although just a single processing unit 702 is shown in the wireless communication device 700 of FIG. 12, in an alternative configuration, a combination of processors (e.g., an ARM and DSP) could be used.

UE 700 may also include memory 706. Memory 706 may be any electronic component capable of storing electronic information. Memory 706 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

As illustrated, at times, data 714 and/or instructions 712 may be stored in memory 706. Instructions 712 may be executable by processing unit 702 to implement the techniques disclosed herein. Executing instructions 712 may involve the use of the data 714 that may be stored in memory 706. When processing unit 702 executes instructions 712, various portions of instructions 712a may be loaded onto the processing unit 702, and various pieces of data 714a may be loaded onto processing unit 702.

UE 700 may also include a transmitter 720 and a receiver 722 to allow transmission and reception of wireless signals to and from other devices (not shown). Transmitter 720 and receiver 722 may be collectively referred to as a transceiver 704. One or more antennas 724a-b may be electrically coupled to transceiver 704. UE 700 may also include (not shown) multiple transmitters, multiple receivers and/or multiple transceivers.

The various components of UE 700 may be coupled together by one or more buses or the like, which may include a power bus, a control signal bus, a status signal bus, a data bus, etc. For the sake of clarity, the various buses are illustrated in FIG. 7 as a bus 710. It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that may be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for receiving on transmit and transmitting on receive. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for use by a base station, the method comprising:
    accessing a neighbor cell list (NCL) corresponding to a coverage area, of the base station, encompassing a first narrow beam coverage region and a second narrow beam coverage region;
    determining a subset of the NCL, corresponding to a first narrow beam and the first narrow beam coverage region, to be transmitted by the base station within the first narrow beam coverage region; and
    transmitting a message indicative of the subset of the NCL.

2. The method as recited in claim 1, wherein the message is transmitted over the first narrow beam.

3. The method as recited in claim 2, wherein the message does not expressly identify that the subset of the NCL corresponds to the first narrow beam and the first narrow beam coverage region.

4. The method as recited in claim 1, wherein the message is transmitted over a second narrow beam and expressly identifies that the subset of the NCL corresponds to the first narrow beam.

5. The method as recited in claim 1, wherein a direction of transmission of the first narrow beam, an intended shape of the first narrow beam coverage region, or both changes over time.

6. The method as recited in claim 1, wherein the subset of the NCL is determined, at least in part, based on a direction of transmission of the first narrow beam, an intended shape of the first narrow beam coverage region, or both.

7. The method as recited in claim 1, wherein the first narrow beam comprises a primary synchronization signal (PSS), a secondary synchronization signal (SSS), a physical broadcast channel (PBCH), a channel state information— reference signal (CSIRS), or some combination thereof.

8. The method as recited in claim 1, wherein the first narrow beam comprises a beam in millimeter wave band.

9. The method as recited in claim 1, and further comprising:
    subsequently receiving a report message indicative of a search result from a search for wireless signals conducted based, at least in part, on the subset of the NCL; and
    affecting the NCL based, at least in part, on the search result.

10. The method as recited in claim 9, wherein the search result is based, at least in part, on a received signal strength for at least one wireless signal received by a device located within an intended shape of the first narrow beam coverage region.

11. The method as recited in claim 9, wherein the search for wireless signals comprised an inter-frequency search, an intra-frequency search, an idle mode search, a connected mode search, or some combination thereof.

12. A base station comprising:
    memory;
    a transmitter; and
    a processing unit coupled to the memory and the transmitter and configured to:
        access a neighbor cell list (NCL) stored in the memory, the NCL corresponding to a coverage area, of the base station, encompassing a first narrow beam coverage region and a second narrow beam coverage region;
        determine a subset of the NCL, corresponding to a first narrow beam and the first narrow beam coverage region to be transmitted via the transmitter within the first narrow beam coverage region; and
        initiate transmission, via the transmitter, of a message indicative of the subset of the NCL.

13. The base station as recited in claim 12, wherein the transmitter transmits the message over the first narrow beam.

14. The base station as recited in claim 13, wherein the message does not expressly identify that the subset of the NCL corresponds to the first narrow beam and the first narrow beam coverage region.

15. The base station as recited in claim 12, wherein the transmitter transmits the message over a second narrow beam and the message identifies that the subset of the NCL corresponds to the first narrow beam.

16. The base station as recited in claim 12, wherein the transmitter is configured to change a direction of transmission of the first narrow beam, an intended shape of the first narrow beam coverage region, or both over time.

17. The base station as recited in claim 12, wherein the processing unit is configured to determine the subset of the NCL based, at least in part, on a direction of transmission of the first narrow beam, an intended shape of the first narrow beam coverage region, or both.

18. The base station as recited in claim 12, and further comprising:
a receiver; and
wherein the processing unit is further coupled to the receiver and configured to:
subsequently obtain a report message via the receiver, the report message being indicative of a search result from a search for wireless signals conducted based, at least in part, on the subset of the NCL; and
affect the NCL as stored in the memory based, at least in part, on the search result.

19. A method for use by a user equipment (UE), the method comprising:
receiving a message indicative of a subset of a neighbor cell list (NCL) for a first narrow beam coverage region, of a coverage area of a base station, corresponding to a first narrow beam, wherein the coverage area, of the base station, encompasses the first narrow beam coverage region and a second narrow beam coverage region; and
searching for one or more wireless signals based, at least in part, on the subset of the NCL.

20. The method as recited in claim 19, wherein the message is received over the first narrow beam and does not expressly identify that the subset of the NCL corresponds to the first narrow beam.

21. The method as recited in claim 19, wherein the message is received over a second narrow beam and expressly identifies that the subset of the NCL corresponds to the first narrow beam.

22. The method as recited in claim 19, wherein the first narrow beam comprises a primary synchronization signal (PSS), a secondary synchronization signal (SSS), a physical broadcast channel (PBCH), a channel state information—reference signal (CSIRS), or some combination thereof.

23. The method as recited in claim 19, wherein the first narrow beam comprises a beam in mm Wave band.

24. The method as recited in claim 19, and further comprising:
generating a search result based, at least in part, on the searching for one or more wireless signals received by the UE while located within an intended shape of the first narrow beam coverage region; and
transmitting a report message indicative of the search result.

25. The method as recited in claim 19, wherein the searching for one or more wireless signals comprises an inter-frequency search, an intra-frequency search, an idle mode search, a connected mode search, or some combination thereof.

26. A user equipment (UE) comprising:
memory;
a receiver; and
a processing unit coupled to the memory and the receiver and configured to:
access at least a portion of a message from the memory, the message having been received via the receiver and being indicative of a subset of a neighbor cell list (NCL) for first narrow beam coverage region of a coverage area, of a base station, corresponding to a first narrow beam to be transmitted by the base station, wherein the coverage region, of the base station, encompasses the first narrow beam coverage region and a second narrow beam coverage region; and
initiate a search via the receiver for one or more wireless signals based, at least in part, on the subset of the NCL.

27. The UE as recited in claim 26, wherein the message was received via the receiver over the first narrow beam and does not expressly identify that the subset of the NCL corresponds to the first narrow beam.

28. The UE as recited in claim 26, wherein the message was received via the receiver over a second narrow beam, and wherein the message expressly identifies that the subset of the NCL corresponds to the first narrow beam.

29. The UE as recited in claim 26, and further comprising:
a transmitter; and
wherein the processing unit is coupled to the transmitter and further configured to:
generate a search result based, at least in part, on one or more wireless signals received via the receiver while the UE is located within an intended shape of the first narrow beam coverage region; and
initiate transmission of a report message via the transmitter, the report message being indicative of the search result.

30. The UE as recited in claim 29, wherein the search result is based, at least in part, on a received signal strength for at least one of the one or more wireless signals received via the receiver while the UE is located within an intended shape of the first narrow beam coverage region.

* * * * *